(12) United States Patent
Sato

(10) Patent No.: US 6,469,748 B1
(45) Date of Patent: Oct. 22, 2002

(54) VIDEO SIGNAL CAPTURING APPARATUS

(75) Inventor: Yuji Sato, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/089,520

(22) Filed: Jun. 3, 1998

(30) Foreign Application Priority Data

Jun. 3, 1997 (JP) ............................................. 9-145419

(51) Int. Cl.[7] ................................................ H04N 9/64
(52) U.S. Cl. ........................ 348/714; 348/715; 348/720; 348/571; 348/725; 348/524; 348/528
(58) Field of Search ............................... 348/714–720, 348/528, 526, 571–575, 605, 642, 725, 726, 727, 728, 524; H04N 9/64

(56) References Cited

U.S. PATENT DOCUMENTS

| | | | |
|---|---|---|---|
| 4,827,341 A | * 5/1989 | Akimoto et al. | 348/526 |
| 4,837,626 A | * 6/1989 | Nishiyama et al. | 348/554 |
| 4,843,471 A | * 6/1989 | Yazawa et al. | 348/716 |
| 4,853,781 A | * 8/1989 | Okano et al. | 348/497 |
| 4,876,598 A | * 10/1989 | Carlstedt et al. | 348/572 |
| 5,063,437 A | * 11/1991 | Owashi et al. | 358/22 |
| 5,208,660 A | * 5/1993 | Yoshida | 348/555 |
| 5,231,517 A | * 7/1993 | Taguchi | 358/453 |
| 5,315,457 A | * 5/1994 | Ono et al. | 360/77.14 |
| 5,339,111 A | * 8/1994 | Park | 348/524 |
| 5,379,073 A | * 1/1995 | Kosugi et al. | 348/513 |
| 5,452,022 A | * 9/1995 | Yamamoto et al. | 348/714 |
| 5,528,295 A | * 6/1996 | Wagner | 250/226 |
| 5,539,472 A | * 7/1996 | Aoki | 348/506 |
| 5,541,665 A | * 7/1996 | Urata et al. | 348/571 |
| 5,631,713 A | * 5/1997 | Hoshino | 348/716 |
| 5,737,036 A | * 4/1998 | Kanai et al. | 348/742 |
| 5,740,092 A | * 4/1998 | Miyake et al. | 708/522 |
| 5,751,375 A | * 5/1998 | Ninomiya et al. | 348/571 |
| 5,777,691 A | * 7/1998 | Kubo et al. | 348/718 |
| 6,069,662 A | * 5/2000 | Horiuchi et al. | 348/446 |
| 6,219,106 B1 | * 4/2001 | Sato | 348/525 |

* cited by examiner

Primary Examiner—John Miller
Assistant Examiner—Linus H. Lo
(74) Attorney, Agent, or Firm—Oliff & Berridge, PLC

(57) ABSTRACT

In a video signal capturing apparatus with a simple construction capable of distinguishing fields in units of a color field, a separation circuit separates from input video signals, vertical synchronizing signals that lead fields in a one-to-one relationship. A field counter formed by, for example, a scale-of-four counter, counts the number of vertical synchronizing signals. Based on the count value of the field counter and values set in a register, a timing generating circuit performs data capture in such a manner that color fields are distinguished from each other. If color field 3 is to be captured, a value "3" is set the register. The timing generation circuit compares a count value from the field counter with the set value "13". When the count value equals 3, the timing generation circuit starts capture of digital video data in the determined field. An even-odd number determining circuit may be provided for distinguishing (i.e., differentiating) an even-numbered field from an odd-numbered field during interlace scanning of the video signal based on the vertical synchronizing signals separated by the separator unit. The timing generation circuit instructs the video data writing control unit to write the digital video data in the memory in such a manner that the odd-numbered field and the even-numbered field are differentiated from each other and the color fields are distinguished from each other.

18 Claims, 3 Drawing Sheets

VIDEO SIGNAL CAPTURING APPARATUS

BACKGROUND OF THE INVENTION

1. Field of Invention

The invention relates to a video signal capturing apparatus used in a system in which video signals captured from, for example, a digital camera or the like, are image-processed or printed.

2. Description of Related Art

Many systems have been developed in which video signals (in this case, static picture image signals in, for example, the NTSC system) captured from a camera or the like, are image-processed in a predetermined manner by a device such as a personal computer or printed out by a printing mechanism. The camera may be a digital camera including a digital video signal output and an analog signal output which both output the same information in digital and analog format respectively. The NTSC system is an example of analog format.

Video signals systems such as a NTSC system use a four-field sequence as described below. An NTSC system employs an interlace scanning method in which a frame is formed by two vertical sweeps and 525 horizontal sweeps. Interleaving is performed to reduce the influence of chroma components on luminance components. That is, a frequency of the color subcarrier waves (i.e., the subcarrier wave for the chrominance signals) is selected such that the multiple product of an odd number and the half period of the subcarrier waves equals the horizontal sweep time duration. Therefore, the color subcarrier waves are completely out of the phase, i.e., inverted 180°, for every horizontal scanning line. Since the total number of horizontal lines scanned for a single frame by two fields, is 525, which is an odd number, the phase of the color subcarrier waves is opposite for every frame. More specifically, the polarity of the sine waveform at a given horizontal position on each scanning line alternates for every frame. Since the total number of horizontal lines scanned for two frames by four fields is 1050, which is an even number, the color subcarrier waves and the horizontal lines are in phase every two frames. Thus, taking multiplex chrominance signals into account, the video signals of the NTSC system are in four-field sequences in which a single sequence, including the phase of the color subcarrier waves (frequency fsc=3.58 MHz), is completed by four fields even in the case of a static picture image. The four fields are termed color fields 1 to 4, respectively.

Conventional apparatuses for processing NTSC video signals employ a circuit for distinguishing an odd-numbered field from an even-numbered field. However, these apparatuses are not able to distinguish odd-numbered or even-numbered fields which are 180° out of phase from the different color subcarrier wave. For example, those apparatuses cannot distinguish color fields 1 and 3 from each other. Odd-numbered or even-numbered fields, such as color fields 1 and 3, may be distinguished from each other, by employing a phase detection mechanism. However, the phase detection mechanism inconveniently complicates the circuit construction of the apparatus.

Mere determination of even-numbered and odd-numbered fields while not differentiating between the color fields of odd numbers or even numbers, for example, between color field 1 and color field 3, does not present any significant or practical problems-in applications such as television. However, this method for distinguishing fields causes a significant problem in the pursuit of higher image quality.

For example, differentiation between even and odd numbered color fields is important in the pursuit of higher image quality in which a three-dimensional YC separation method or the like is employed. Whereas, for a two-dimensional YC filter, the range of extraction of peripheral components of the color subcarrier waves as chrominance signals is limited to the dimensions of horizontal frequency and vertical frequency, a three-dimensional YC separation filter must be provided with a time-frequency characteristic to take into account the relationship between a field in one frame and the corresponding field in another frame. However, in four-field sequence systems, the color subcarrier waves of two odd-numbered fields, or two even-numbered fields of two consecutive frames are completely opposite in phase to each other. Therefore, a three-dimensional YC separation filter cannot be directly employed in the four-field sequence system. That is, color fields 1 and 3 and color fields 2 and 4 need to be distinguished and separated prior to processing by the three-dimensional YC separation filter.

While the problems of the conventional art have been described with reference to the NTSC video signals, substantially the same problems occur with the video signals of other systems, such as a phase alternation line (PAL) system.

SUMMARY OF THE INVENTION

Accordingly, it is an aspect of the invention to provide a video signal capturing apparatus capable of distinguishing fields in a color field unit with a simple construction.

According to the invention, there is provided a video signal capturing apparatus including a converter unit that converts an input video signal into digital video data and a video data writing control unit that performs control such that the digital video data converted by the converter unit is written in a memory. This video signal capturing apparatus captures video data for an external processing apparatus that uses the digital video data stored in the memory. A separator unit separates a vertical synchronizing signal from the input video signal. A determining unit distinguishes a plurality of color fields in the video signal on the basis of a number of vertical synchronizing signals separated by the separator unit. When the determining unit determines that a field corresponds to a field indicated by a setting, a writing instructing unit instructs the video data writing control unit to write the digital video data in the memory.

In the video signal capturing apparatus of the invention, the converter unit converts the input video signal into digital video data, and the video data writing control unit performs control such that the digital video data converted by the converter unit is written in the memory. By writing digital video data in the memory in this manner using the video data writing control unit, video data for an external processing apparatus, such as a personal computer, that uses the digital video data stored in the memory, is captured.

In addition to the basic operation described above, the separator unit separates a vertical synchronizing signal from the input video signal. The determining unit distinguishes a plurality of color fields in the video signal based on a number of vertical synchronizing signals separated by the separator unit. When a field determined by the determining unit corresponds to a field indicated by a setting, the writing instructing unit instructs the video data writing control unit to write the digital video data in the memory.

The video signals in the NTSC system are in four-field sequences in which a single sequence, including the phase of the color subcarrier waves, is completed by four fields even for a static picture image, taking multiplex chrominance signals into consideration, as described above. In the PAL system, video signals are in eight-field sequences. In the case of the NTSC video signals, the four fields are termed color fields 1 to 4. The video signal capturing apparatus of the invention is able to write in the memory only the field that corresponds to the field indicated by the setting. Therefore, the apparatus of the invention can perform video signal capture in which, for example, capture of color field 1 is achieved by the capture of color field 3 or capture of color field 2 is achieved by the capture of color field 4. If color field 1 is captured, color field 3 can be captured merely by determining a color field that occurs two fields after color field 1. If color field 2 is captured, color field 4 can also be captured in the manner as described above.

This operation of the apparatus makes it possible to capture, for example, color field 1, store it in the memory and then transfer it to the personal computer and, after that, capture color field 3, store it in the memory and transfer it to the personal computer. Therefore, the personal computer can obtain color field 3 subsequently to color field 1. Likewise, the personal computer can also obtain color field 4 subsequent to color field 2.

Since the apparatus of the invention is able to capture the four fields separately, the video signal capturing apparatus can capture each color field while shifting the capture timing, i.e., delaying the timing, as needed at the processing side, e.g., in the personal computer, as far as static images are concerned. Since the apparatus is able to perform a capture operation in which, for example, color field 1 is first captured from the input NTSC signals and, after the personal computer completes predetermined processing of the transferred color field, color field 3 is captured, it becomes possible to reduce the required capacity of the memory.

In the invention, the determination or identification of a color field is performed based on the number of vertical synchronizing signals. Therefore, the color field determination may be performed by, for example, counting the number of vertical synchronizing signals. Since each field is led by a vertical synchronizing signal, counting the-number of vertical synchronizing signals enables determination of the relative sequential placement of a given field in, for example, four consecutive fields in the case of the NTSC video signals. Although distinguishing color fields can also be accomplished by detecting the phase of the color subcarrier waves, this type of detection mechanism requires a rather complicated circuit construction. In contrast, the invention requires a much less complicated construction.

The determining unit in the invention merely needs to distinguish a plurality of color fields based on the number of vertical synchronizing signals. The determining unit may include, for example, a scale-of-N counter that counts the number of vertical synchronizing signals separated by the separator unit, wherein N is the number of color fields. For example, a scale-of-four counter is used for the NTSC system and a scale-of-eight counter is used for the PAL system. If the number of vertical synchronizing signals is counted by such a counter, a given count value always indicates the same field among the plurality of fields. Therefore, by capturing a field indicated by, for example, a count value 1 and, after that, capturing a field indicated by a count value 3, field capture can be performed such that the personal computer can obtain, for example, color field 3 subsequent to obtaining color field 1 or color field 4 subsequent to obtaining color field 2.

Although the writing of digital video data in the memory may be performed by a CPU, it is also possible to use a direct memory access (DMS) as a controller for the writing. Since a CPU needs to have a considerably high-speed operating performance in order to perform the writing of the digital video data in the memory, employment of the DMA is normally more practical.

The video signal capturing apparatus of the invention may further include an even-odd number determining unit that differentiates an even-numbered field and an odd-numbered field in interlace scanning of the video signal on the basis of the vertical synchronizing signal separated by the separator unit. In this construction, the writing instructing unit is capable of instructing the video data writing control unit to write the digital video data in the memory in such a manner that the odd-numbered field and the even-numbered field are differentiated and the color fields are distinguished.

If the apparatus of the invention containing structure for determining whether a field is an even-numbered field or an odd-numbered field, the even-numbered fields and the odd-numbered fields can be distinguished so that a plurality of fields can be separately captured based on absolute identification instead of relative identification. In the case of the NTSC video signals, it is determined with regard to each field, whether the field is an odd-numbered field or an even-numbered field. If a field is determined as an odd-numbered field, the odd-numbered field, e.g., color fields 1 or 3, can be identified. Likewise, an even-numbered field, e.g., color fields 2 or 4, can also be identified. With this construction, four fields can be identified and captured and can be processed by the external processing apparatus, while only one memory is used.

BRIEF DESCRIPTION OF THE DRAWINGS

Preferred embodiments of the present invention will be described in detail with reference to the following figures wherein.

DETAILED DESCRIPTION OF PREFERRED EMBODIMENTS

Preferred embodiments of the present invention will be described in detail hereinafter with reference to the accompanying drawings.

Figure 1:
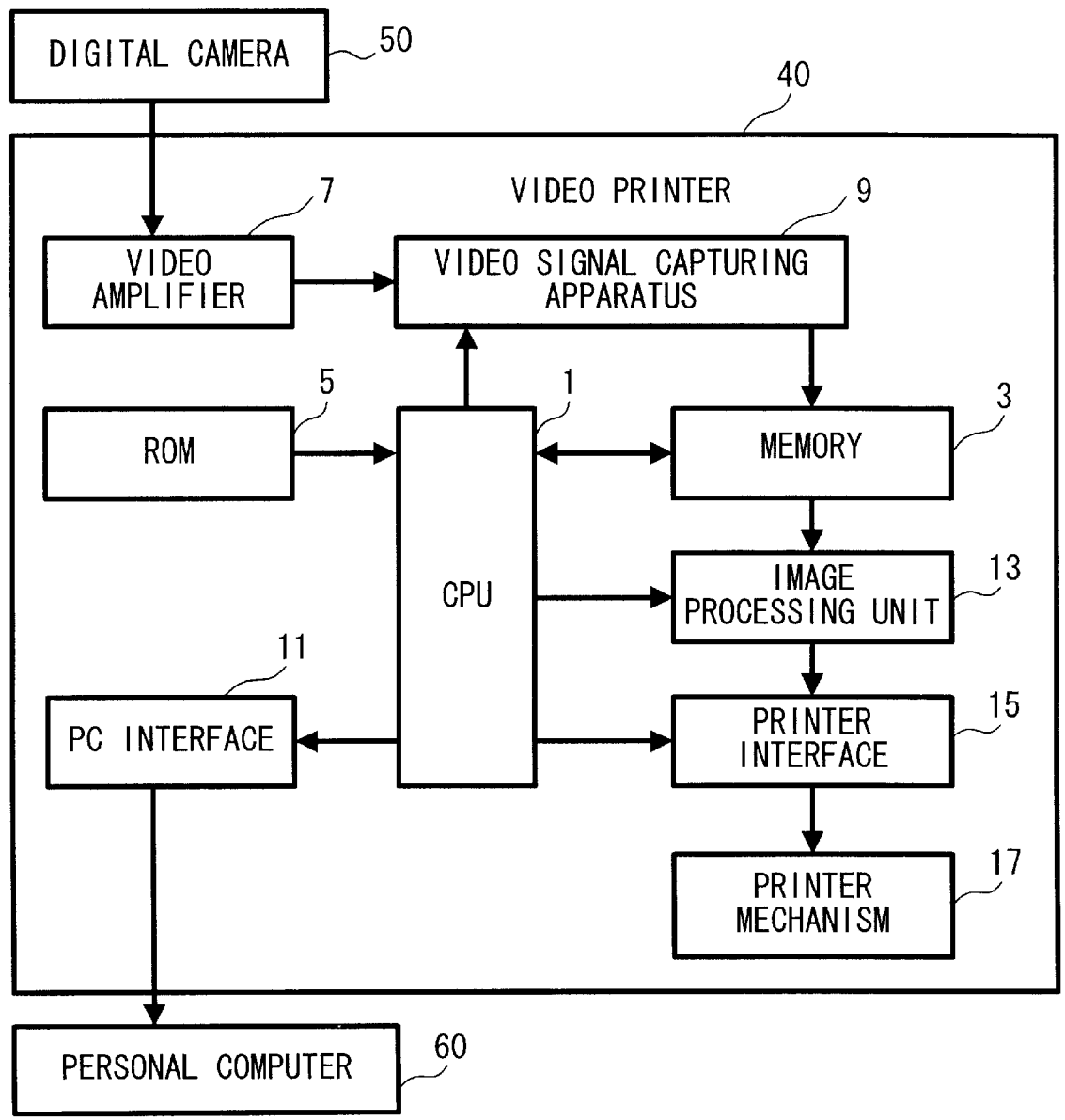
FIG. 1 is a schematic block diagram of a video printer that employs a video signal capturing apparatus according to a first preferred embodiment of the invention.

FIG. 1 is a schematic block diagram of a video printer employing a video signal capturing apparatus according to a first embodiment of the invention.

The video printer 40 includes a CPU 1 for controlling the entire system of the video printer, a memory 3, a ROM 5 storing operation programs for the CPU 1 and the like, a video amplifier 7, a video signal capturing apparatus 9, a personal computer (PC) interface 11, an image processing unit 13, a printer interface 15 and a printer mechanism 17.

The memory 3 in this embodiment is formed by a DRAM, and is used to, for example, temporarily store the digital video data captured by the video signal capturing apparatus 9.

The video amplifier 7 amplifies video signals, for example, color video signals input from an externally provided camera 50, and outputs the amplified signals to the video signal capturing apparatus 9. The camera 50 may be a digital camera including both digital and analog signal outputs for outputting digital and analog video signals. The preferred embodiments of the invention are explained assuming that the video signal capturing apparatus is analyzing analog video signals output from the camera 50.

The video signal capturing apparatus 9 converts the analog color video signals produced by the video amplifier 7 into digital signals and selectively captures only desired portions of the converted digital video signals and writes the captured signal portions in the memory 3. The internal construction of the video signal capturing apparatus 9 will be described in detail below.

The PC interface 11 is an interface that is connected to the CPU 1 for data exchange with an externally-provided personal computer 60. The video signals captured by the video signal capturing apparatus 9 and stored in the memory 3 can be transferred to the personal computer 60 via the PC interface 11.

The video signals captured by the video signal capturing apparatus 9 and stored in the memory 3 can be image-processed by the image processing unit 13 and then transferred to the printer mechanism 17 via the printer interface 15 for print processing. The printer mechanism 17 has a print device of an ink jet type, a thermal transfer type, or the like, and records the image data and the like received via the printer interface 15 on a recording sheet.

In the case of the transfer of video signals to the printer mechanism 17, the video signals stored in the memory 3 are subjected to processing, e.g., YC separation and are transferred to a local memory (not shown) provided in the image processing unit 13. Next, the image processing unit 13 performs predetermined image processing, e.g., image area separation, outline enhancement (high area enhancement), color correction, black generation, y-correction, error diffusion and the like on the color digital image signals stored in the local memory. The image-processed color digital image signals are transferred to the printer mechanism 17 via the printer interface 15.

Figure 2:
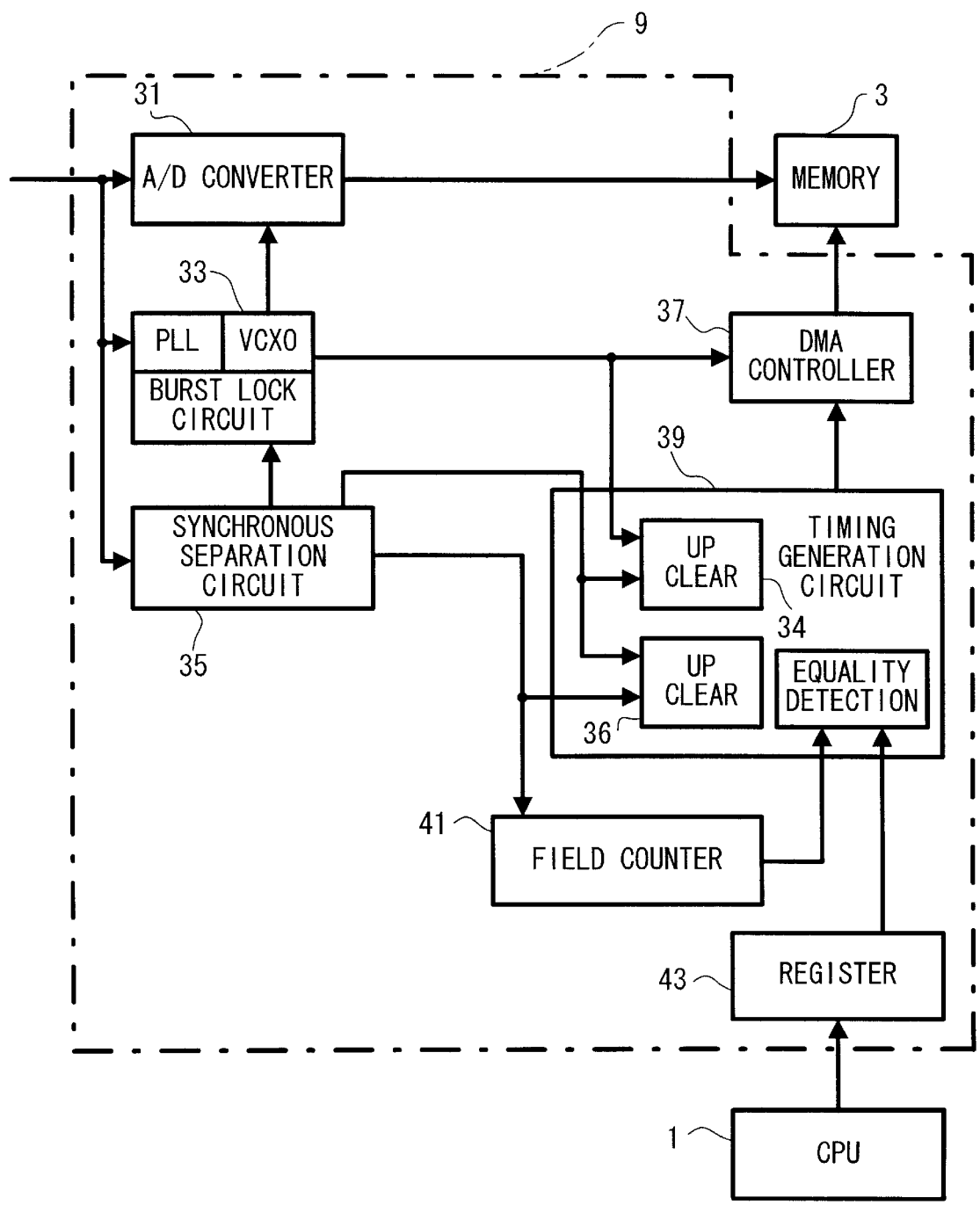
FIG. 2 is a circuit block diagram of the video signal capturing apparatus according to the first embodiment.

The general construction of the video printer employing the video signal capturing apparatus 9 should be understood from the foregoing brief description. The structure of the video signal capturing apparatus 9 will now be described with reference to the block diagram of FIG. 2.

The video signal capturing apparatus 9 includes an A/D converter 31 (i.e., a converter unit), a burst lock circuit 33, a synchronous separation circuit 35 (i.e., a separator unit), a direct memory access (DMA) controller 37, a timing generation circuit 39, a field counter 41 and a register 43. The burst lock circuit 33 and the DMA controller 37 constitute a video data writing control unit. The timing generation circuit 39, the field counter 41 and the register 43 constitute a writing instructing unit.

The analog color video signals from the video amplifier 7 shown in FIG. 1 are input to the AID converter 31, the burst lock circuit 33 and the synchronous separation circuit 35.

The A/D converter 31 converts the input analog color video signals into digital video data and outputs the data to the memory 3. The digital video data from the A/D converter 31 are written in the memory 3 if a writing instruction is output from the DMA controller 37. The digital video data which is written in the memory 3 can be transferred to the external personal computer 60 via the PC interface 11. Thus, the video signal capturing apparatus 9 performs the video data capture for the personal computer 60.

The video data capture in this embodiment is performed in a sophisticated manner to process video signals of the NTSC system. Video signals of the NTSC system are in four-field sequences in which a single sequence, including the phase of the color subcarrier waves, is completed by four fields even for a static picture image, taking multiplex chrominance signals into consideration.

In the case of NTSC signals, the four fields are termed color fields 1 to 4. The video signal capturing apparatus 9 first captures a first field, for example, color field 1, and then captures color field 3. Alternatively, the apparatus 9 captures color field 2 and then captures color field 4.

The capture of color fields as described above can be realized by the above-described individual circuits operating as follows.

The aforementioned synchronous separation circuit 35 separates the horizontal synchronizing signals and the vertical synchronizing signals in the input video signals. The horizontal synchronizing signals and the vertical synchronizing signals are output from the synchronous separation circuit 35 to the timing generation circuit 39. The vertical synchronizing signals are also output to the field counter 41. The burst gate signals that occur at a predetermined time following the horizontal synchronizing signals are output from the synchronous separation circuit 35 to the burst lock circuit 33.

In the burst lock circuit 33, a VCXO portion oscillates at four times the frequency of the burst signals (3.58 MHz×4) and outputs clock signals to the A/D converter 31 and the DMA controller 37. The clock signals are also output to the timing generation circuit 39.

The timing generation circuit 39 has two different internal counters. The first counter 34 is counted up by the clock signals from the burst lock circuit 33 and cleared to zero by the horizontal synchronizing signals. The second counter 36 is counted up by the horizontal synchronizing signals and is cleared by the vertical synchronizing signals.

The vertical synchronizing signals from the synchronous separation circuit 35 are also output to the field counter 41. The field counter 41 is formed as a scale-of-four counter in this embodiment. Since each field is led by a vertical synchronizing signal, counting the number of vertical synchronizing signals enables determination of the relative sequential placement of a given field of the four fields in NTSC signals. The count value of the field counter 41 is output to the timing generation circuit 39.

The timing generation circuit 39 also receives values set in the register 43 by the CPU 1. In this embodiment, the timing generation circuit 39 determines a timing at which effective ranges of data, i.e., the range of data from only the portions that carry image information, are written in the memory 3 based on the two internal counters 34, 36 of the timing generation circuit 39 and the values set in the register 43. Since a vertical synchronizing signal leads each field, the vertical synchronizing signals provide a basis for determining the number of fields. Further, since a horizontal synchronizing signal occurs for every horizontal scanning unit, the horizontal synchronizing signals provide a basis for determining the start of each portion carrying image information which follows the corresponding horizontal synchronizing signal. The end of the portion carrying image information in each horizontal scanning unit can be determined by counting up from the start of the portion based on the clock signals. More specifically, when the counted-up value equals a value for capture start set in the register 43, the timing generation circuit 39 outputs a trigger to the DMA controller 37 to cause the DMA controller 37 to output the writing instruction to the memory 3. Further, when the counted-up value equals a value for capture end set in the register 43, the timing generation circuit 39 outputs a trigger to the DMA controller 37 to stop outputting the writing instruction to the memory 3.

Therefore, the basic digital video data capture performed by the video signal capturing apparatus 9 of this embodiment is achieved by the following operations.

When a horizontal synchronizing signal separated from the video signals is input to the timing generation circuit 39, the first internal counter 34 of the timing generation circuit 39 is cleared. The internal counter 34 is then counted up based on the clock signals. When the value of the internal counter 34 reaches the value for capture start set in register 43, the timing generation circuit 39 outputs a trigger to the DMA controller 37 so that the DMA controller 37 outputs the writing instruction to the memory 3. Subsequently, the data from the A/D converter 31 are written in the memory 3.

Next, when the internal counter 34 of the timing generation circuit 39 cleared by the horizontal synchronizing signals and counted up by the clock signals becomes a value equal to the value set for capture end set in the register 43, the timing generation circuit 39 outputs a trigger to the DMA controller 37. Thereby, the DMA controller 37 stops outputting the writing instruction to the memory 3. Subsequently, the data from the A/D converter 31 are prevented from being written in the memory 3.

Through this operation, the memory 3 stores only the selected data from the digital video data output from the A/D converter 31. That is, the memory 3 stores the digital video data corresponding only to periods during which image information is transmitted.

Although the basic operation of digital video data capture is performed as described above, the timing generation circuit 39 of this embodiment enables data capture in which the color fields are separated based on the count value of the field counter 41 and the values set in the register 43.

More specifically, if, for example, color field 3 is to be captured, a value "3" is set in the register 43. The timing generation circuit 39 compares the count value from the field counter 41 with the set value "3". When the count value equals the set value, the digital video data capture is started in the procedure described above. That is, the data capturing operation in the field is not started if the count value from the field counter 41 does not equal the value set in the register 43.

This operation makes it possible to capture, for example, color field 1, store the field in the memory 3 and then transfer the field to the personal computer 60. Subsequently, the operation can capture color field 3, store that field in the memory 3 and then transfer that field to the personal computer 60. Therefore, the personal computer 60 can obtain color field 3 subsequently to color field 1. Similarly, the personal computer 60 can also obtain color field 4 subsequently to color field 2.

Since this embodiment is able to capture the four fields separately, the embodiment can capture each color field while shifting the capture timing, i.e., delaying the timing, as needed by the processing side, e.g., personal computer 60 for static images. Since the embodiment is able to, for example, capture color field 1 from the input NTSC signals and, after the personal computer 60 processes color field 1, capture color field 3, it becomes possible to reduce the required capacity of the memory 3.

The identification of a color field is performed by the field counter 41 counting the number of vertical synchronizing signals. Although differentiation of color fields can also be accomplished by detecting the phase of the color subcarrier waves, the detection mechanism requires a rather complicated circuit structure. In contrast, this embodiment achieves color field differentiation simply by counting the number of vertical synchronizing signals. Therefore, the embodiment requires a much less complicated structure.

While the first preferred embodiment of the invention has been described, the invention is not limited to the first embodiment in any manner. The invention can be carried out in various other manners without departing from the scope of the invention.

For example, although the foregoing embodiment uses the DMA controller 37 to control of the writing of digital video data in the memory 3, the writing of digital video data in the memory may be performed by a conventional CPU. However, since a CPU needs to have high-speed operating performance in order to perform the writing of the digital video data in the memory, employment of a DMA controller 37 is more practical.

The first embodiment does not perform absolute identification of the four color fields. The first embodiment merely performs relative identification of color fields based on the count value of the field counter 41. For example, if the field counter 41 is counted to "1" when color field 1 is first captured, then color field 3 can be subsequently captured by capturing a field that occurs when the count value of the field counter 41 becomes "3".

Figure 3:
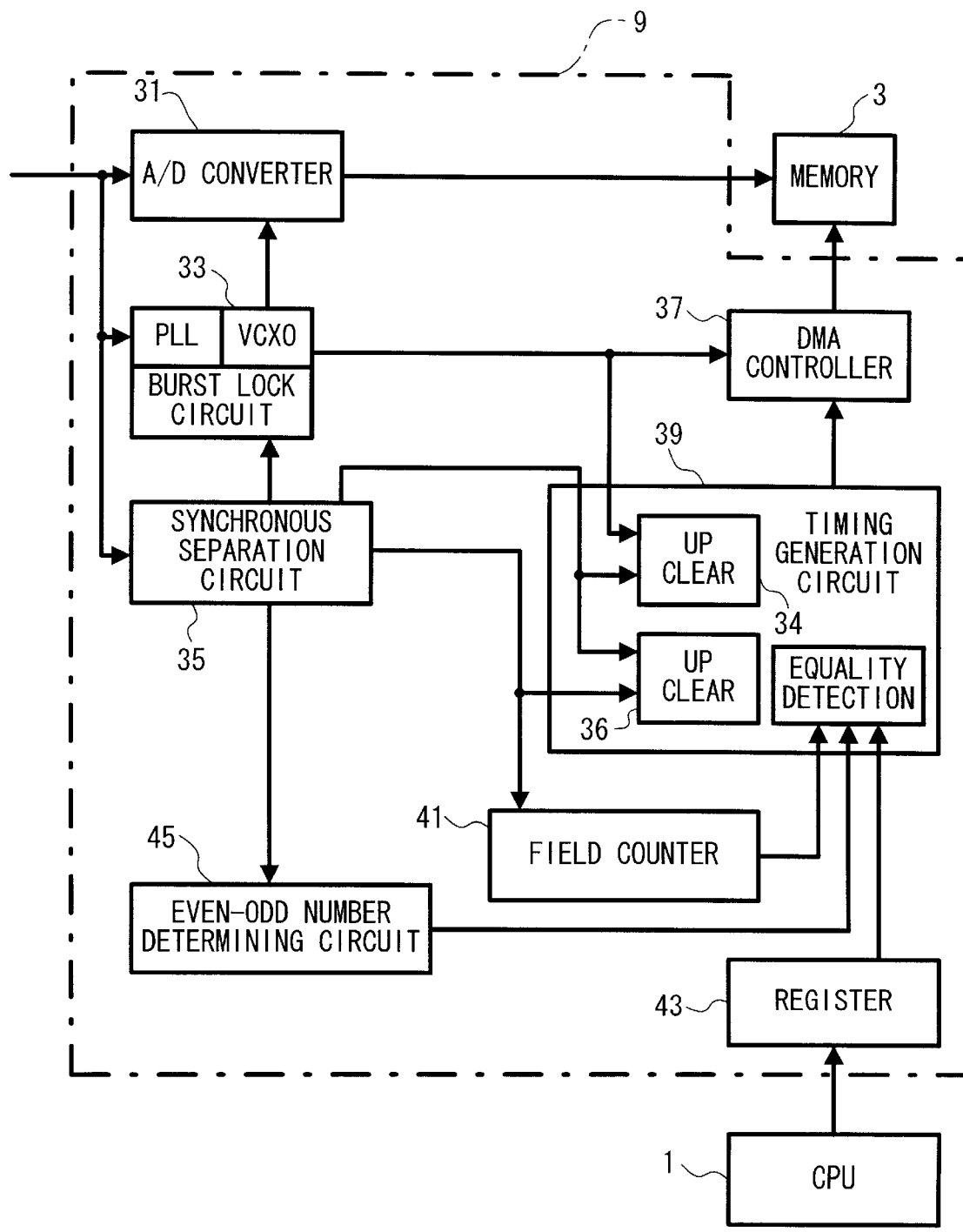
FIG. 3 is a circuit block diagram of the video signal capturing apparatus according to a second preferred embodiment.

A second embodiment of the invention performs more complete identification of color fields by employing an even-odd number determining circuit 45 for distinguishing odd-numbered fields and even-numbered fields in the interlace scanning of video signals. As shown in FIG. 3, the even-odd number determining circuit 45 is coupled to the timing generation circuit 39 and the synchronous separation circuit 35. The timing generation circuit 39 outputs the writing instruction to the memory 3 based on a determination by the even-odd number determining circuit 45 and the count value of the field counter 41. Therefore, fields are distinguished based on color fields and odd or even-numbered fields.

In the second embodiment, the synchronous separation circuit 35 separates the horizontal synchronizing signals and the vertical synchronizing signals in the input video signals. The horizontal synchronizing signals and the vertical synchronizing signals are output from the synchronous separation circuit 35 to the timing generation circuit 39 and the even-odd number determining circuit 45. The vertical synchronizing signals are also output to the field counter 41. The burst gate signals that occur at a predetermined time following the horizontal synchronizing signals are output from the synchronous separation circuit 35 to the burst lock circuit 33.

By comparing the vertical synchronizing signal and the horizontal synchronizing signals, the even-odd number determining circuit 45 determines whether a field is an even-numbered field or an odd-numbered field. The even-odd number determining circuit 45 may consist of, for example, a latch circuit that receives the horizontal and vertical synchronizing signals from the synchronous separation circuit 35. The latch circuit outputs an output signal which corresponds to the lengthened horizontal synchronizing signal, when the vertical synchronizing signal transitions from a low level to a high level. Therefore, if the level of the lengthened horizontal synchronizing signal is high when the vertical synchronizing signal transitions from a low level to a high level, then the even-odd number determining circuit 45 outputs a high level, corresponding to the high level of the lengthened horizontal synchronizing signal. This high level, would be an indication of, for example, an odd numbered field.

The even-odd number determining circuit 45 outputs the output signal with the high level until the next time that the vertical synchronizing signal transitions from a low level to a high level. Theoretically, the next time the vertical synchronizing signal makes such a transition, the horizontal synchronizing signal will be at a low level and the even-odd number determining circuit 45 will output a low level output signal indicating, for example, an even numbered field.

By comparing the vertical and horizontal synchronizing signals, the even-numbered and odd-numbered fields can be distinguished so that a plurality of fields can be separately captured based on absolute identification instead of relative identification. That is, with regard to each field, it is determined whether the field is an odd-numbered or even-numbered field. If the field is odd-numbered, the odd-numbered field, e.g., color fields 1 or 3, can be identified based on the count value. Likewise, an even-numbered field, e.g., color fields 2 or 4, can also be identified. With this construction, four fields can be identified and captured and can be processed by the personal computer 60 while only one memory 3 is used.

Although the foregoing embodiments are described in conjunction with the NTSC video signals, the invention is capable of capturing video signals in other systems, e.g., the phase alternation line (PAL) system, in substantially the same manner. While the NTSC video signals are in four-field sequences in which a single sequence, including the phase of the color subcarrier waves, is completed by four fields even for a static picture image, taking multiplex chrominance signals into consideration, the PAL video signals are in eight-field sequences. Therefore, the capture of the PAL video signals according to the invention can be achieved simply by using a scale-of-eight counter as the field counter 41.

Although the foregoing embodiments are described in conjunction with the video printer, the application of the invention is not limited to video printers. The invention may be applied in substantially the same manner to any system that captures video signals and performs data-processing on the signals.

It is to be understood that the invention is not restricted to the particular forms shown in the foregoing embodiment. Various modifications and alternations can be made thereto without departing from the scope of the invention.

What is claimed is:

1. A video signal capturing apparatus for capturing digital video data stored in a memory, the digital video data corresponding to image data for use by a processing apparatus, the video signal capturing apparatus comprising:
    a separator unit that separates a vertical synchronizing signal from an input video signal;
    a video data writing control unit that controls writing digital video data in the memory;
    a determining unit that distinguishes a plurality of color fields in the video signal based on a numbered count of vertical synchronizing signals separated by the separator unit; and
    a writing instructing unit that instructs the video data writing control unit to write the digital video data in the memory when a field determined by the determining unit corresponds to a field indicated by a setting, wherein the writing instructing unit comprises a timing generation circuit that determines when the digital video data is written in memory, a field counter that outputs a count value to the timing generation circuit, and a register which contains the field indicated by the setting, and wherein the timing generation circuit comprises a first and a second internal counter, the first internal counter counting up by clock signals and cleared to zero by horizontal synchronizing signals, the second internal count counting up by the horizontal synchronizing signals and cleared to zero by the vertical synchronizing signals, the timing generation circuit determining when the digital video data is written in the memory based on outputs of the first and second internal counters and the field indicated by the setting in the register.

2. A video signal capturing apparatus according to claim 1, further comprising a converter unit that converts the input video signal into the digital video data which is written in the memory.

3. A video signal capturing apparatus according to claim 1, further comprising an even-odd number determining unit that differentiates an even-numbered field from an odd-numbered field during interlace scanning of the video signal based on the vertical synchronizing signal separated by the separator unit,
    wherein the writing instructing unit instructs the video data writing control unit to write the digital video data in the memory in such a manner that the odd-numbered field and the even-numbered field are differentiated from each other and the color fields are distinguished from each other.

4. A video signal capturing apparatus according to claim 1, wherein the writing of digital video data in the memory is performed by a direct memory access.

5. A video signal capturing apparatus according to claim 4, further comprising an even-odd number determining unit that differentiates an even-numbered field from an odd-numbered field during interlace scanning of the video signal based on the vertical synchronizing signal separated by the separator unit,
    wherein the writing instructing unit instructs the video data writing control unit to write the digital video data in the memory in such a manner that the odd-numbered field and the even-numbered field are differentiated from each other and the color fields are distinguished from each other.

6. A video signal capturing apparatus according to claim 1, wherein the determining unit includes a scale-of-N counter that counts a number of vertical synchronizing signals separated by the separator unit, N being a number of color fields.

7. A video signal capturing apparatus according to claim 6, further comprising an even-odd number determining unit that differentiates an even-numbered field from an odd-numbered field during interlace scanning of the video signal based on the vertical synchronizing signal separated by the separator unit,
    wherein the writing instructing unit instructs the video data writing control unit to write the digital video data in the memory in such a manner that the odd-numbered field and the even-numbered field are differentiated from each other and the color fields are distinguished from each other.

8. A video signal capturing apparatus according to claim 6, wherein the writing of digital video data in the memory is performed using a direct memory access.

9. A video signal capturing apparatus according to claim 8, further comprising an even-odd number determining unit that differentiates an even-numbered field from an odd-numbered field during interlace scanning of the video signal based on the vertical synchronizing signal separated by the separator unit, wherein the writing instructing unit instructs the video data writing control unit to write the digital video data in the memory in such a manner that the odd-numbered field and the even-numbered field are differentiated from each other and the color fields are distinguished from each other.

10. A method for capturing digital video data stored in a memory, the digital video data corresponding to image data for use by a processing apparatus, the method comprising:

separating a vertical synchronizing signal from an input video signal;

writing digital video data in the memory;

distinguishing a plurality of color fields in the video signal by determining a field identification based on a numbered count of vertical synchronizing signals; and instructing the writing of the digital video data in the memory when a determined field identification corresponds to a field identification indicated by a setting, wherein a first internal count counts up by clock signals and is cleared to zero by horizontal synchronizing signals, a second internal counter counts up by the horizontal synchronizing signals and is cleared to zero by the vertical synchronizing signals, and a timing generation determines when the digital video data is written in the memory based on the first and second internal counts and a registration of the field indicated by the setting.

11. A method according to claim 10, further comprising converting the input video signal into the digital video data which is written in the memory.

12. A method according to claim 10, further comprising differentiating an even-numbered field from an odd-numbered field during interlace scanning of the video signal based on the vertical synchronizing signal, wherein the instructing step instructs the video data writing control unit to write the digital video data in the memory in such a manner that the odd-numbered field and the even-numbered field are differentiated from each other and the color fields are distinguished from each other.

13. A method according to claim 10, wherein the writing of digital video data in the memory is performed by a direct memory access.

14. A method according to claim 13, further comprising differentiating an even-numbered field from an odd-numbered field during interlace scanning of the video signal based on the vertical synchronizing signal, wherein the instructing step is performed in such a manner that the odd-numbered field and the even-numbered field are differentiated from each other and the color fields are distinguished from each other.

15. A method according to claim 10, wherein the distinguishing step includes counting a number of separated vertical synchronizing signals using a scale-of-N counter, N being a number of color fields.

16. A method according to claim 15, further comprising differentiating an even-numbered field from an odd-numbered field during interlace scanning of the video signal based on the separated vertical synchronizing signal, wherein the instructing step instructs the digital video data be written in the memory in such a manner that the odd-numbered field and the even-numbered field are differentiated from each other and the color fields are distinguished from each other.

17. A method according to claim 15, wherein the writing of digital video data in the memory is performed using a direct memory access.

18. A video signal capturing apparatus for capturing digital video data stored in a memory, the digital video data corresponding to image data for use by a processing apparatus, the video signal capturing apparatus comprising:

means for separating a vertical synchronizing signal from an input video signal;

means for writing digital video data in the memory;

means for distinguishing a plurality of color fields in the video signal by determining a field identification based on a numbered count of vertical synchronizing signals; and means for instructing the writing of the digital video data in the memory when a determined field identification corresponds to a field identification indicated by a setting, wherein a timing generation circuit determines when the digital video data is written in the memory, a field counter outputs a count value to the timing generation circuit, and a register contains the field indicated by the setting, and wherein the timing generation circuit comprises a first and a second internal counter, the first internal counter counting up by clock signals and cleared to zero by horizontal synchronizing signals, the second internal counter counting up by the horizontal synchronizing signals and cleared to zero by the vertical synchronizing signals, the timing generation circuit determining when the digital video data is written in the memory based on outputs of the first and second internal counters and the field indicated by the setting in the register.

* * * * *